United States Patent [19]

Tsukada

[11] Patent Number: 4,953,988
[45] Date of Patent: Sep. 4, 1990

[54] LINEAR GUIDE APPARATUS WITH CLAMP DEVICE

[75] Inventor: Toru Tsukada, Gumma, Japan

[73] Assignee: Nippon Seiko Kabushiki Kaisha, Tokyo, Japan

[21] Appl. No.: 432,481

[22] Filed: Nov. 7, 1989

[30] Foreign Application Priority Data

Nov. 9, 1988 [JP] Japan .................. 63-146086[U]

[51] Int. Cl.$^5$ ............................................. F16C 29/06
[52] U.S. Cl. ............................................ 384/8; 384/45
[58] Field of Search .................. 384/8, 45, 43, 44; 464/168

[56] References Cited

U.S. PATENT DOCUMENTS

| | | | |
|---|---|---|---|
| 2,440,919 | 5/1948 | Shaw | 384/8 |
| 4,417,771 | 11/1983 | Teramachi . | |
| 4,730,945 | 3/1988 | Luther et al. | 384/45 |
| 4,773,770 | 9/1988 | Osawa et al. | 384/45 |

Primary Examiner—Lenard A. Footland
Attorney, Agent, or Firm—Basile and Hanlon

[57] ABSTRACT

A linear guide apparatus has a fall-off prevention and a clamp device built therein. The fall-off prevention and clamp device includes a piston and a top integrally secured to the end of a piston rod. The piston having a piston head is accommodated in an inner bore serving as a fluid pressure cylinder formed vertically in a slider. The top engages a T-shaped groove formed in a guide rail and extending axially over the whole length thereof. A belleville spring normally urges the piston head toward the guide rail, that is, in a non-clamp direction to move the top away from the inner surface of a neck portion of the T-shaped groove. When a fluid pressure is applied to the piston head at the piston rod side against the belleville spring, the piston together with the top moves away from the guide rail, that is, in a clamp direction to bring the top into engagement with the inner surface of the neck portion of the T-shaped groove. As a result, the slider is clamped to the guide rail. The top and the T-shaped groove in which the top is accommodated also serve to prevent the slider from falling off the guide rail.

5 Claims, 2 Drawing Sheets

LINEAR GUIDE APPARATUS WITH CLAMP DEVICE

BACKGROUND OF THE INVENTION

1. Field of the Invention

The present invention relates to a linear guide apparatus which includes a clamp device built therein for preventing the fall-off of a slider and a guide rail, and for securing the slider to the guide rail if necessary.

2. Description of the Prior Art

A linear guide apparatus with a clamp (or lock) device of this type is disclosed, for example, in U.S. Pat. No. 4,417,771.

In this apparatus, both lateral side surfaces of an upper half part of a guide rail are slanted downwardly and inwardly to a marrow width so as to form slant surfaces (substantially inverted-trapezoidal cross section). On the other hand, a side surface slide member having a cross section of a substantially inverted-right-angled triangle and having a slant surface matched with the slant surface of the guide rail is fitted to each of the inner surfaces of both side walls of the slider (bearing) which is straddlingly mounted on the guide rail.

Furthermore, the slider is formed with a pair of through holes and a clamping female screw at an intermediate position between the through holes in each lateral side. Thus, by screwing a male screw which engages the female screw, the side slide member mounted in an inner bore of the slider is pressed against a slide surface of the guide rail to clamp the slider to the guide rail.

Accordingly, even when the apparatus is used in an inverted condition by securing the guide rail to a ceiling and the slider hanging therefrom, and even when no balls are provided in the slider to which an object to be carried is mounted, since the lateral side surfaces of the guide rail engage the slant surfaces of the side surface slide members fitted to the side walls of the slider, fall-off of the slider is prevented and the safety is insured.

Furthermore, when a cutter holder is mounted on the slider and machining is performed by stopping the cutter holder at a predetermined position along the guide rail, the male screw is advanced by turning a handle of the clamp device to press a center portion of the side slide member. As a result, the side slide member is curved and the center portion protrudes inwardly and presses against the slant surface of the guide rail. In this manner, the slider is clamped to the guide rail and the cutting can be performed with high accuracy.

However, in the prior art apparatus, a problem exists in that since the lateral side surfaces of the guide rail are formed as slant surfaces, and since the slant surfaces serve as reference surfaces, it has been very difficult to machine rolling grooves for filling members therein with high accuracy.

Furthermore, another problem exists in that since the fall-off preventing device and the clamp device are formed as separate members, the number of parts is increased and the structure becomes more complex.

Moreover, another problem exists in that since the clamp device is manipulated by the handle, a remote operation is impossible, and when the apparatus is used in a travelling condition along a ceiling, the clamping cannot be performed as required.

SUMMARY OF THE INVENTION

The present invention was made in view of the above-mentioned problems in the prior art, and it is an object of the invention to provide a linear guide apparatus with a clamp device in which the machining of the rolling member rolling grooves or the like is easy, and a fall-off preventing device for the slider and the guide rail and a clamp device are formed integrally with each other, and the structure is simple and permits a remote manipulation.

In order to achieve the object, in a linear guide apparatus in the present invention comprising an axially extending guide rail having a square cross section and having axially extending rolling member rolling grooves formed in both lateral side surfaces, a slider straddlingly mounted on the guide rail movably and having rolling member rolling grooves formed in inner surfaces of side walls respectively opposing the rolling member rolling grooves of the guide rail, and a multiplicity of balls rollably inserted in the opposing rolling member rolling grooves of the guide rail and the slider, the improvement in which a groove is formed in an upper surface of the guide rail extending over the whole length thereof, a fluid pressure cylinder is formed upwardly in an inner surface of the slider opposing the groove of the guide rail, and a top which engages the groove to prevent slip-out is formed integrally with a piston which engages the fluid pressure cylinder. When the piston is energized by elastic energizing means in a non-clamp direction, the top is separated from a groove surface of the groove of the guide rail, and the guide rail and slider are in a non-clamp condition. When the piston is energized in a clamp direction by a fluid pressure against the elastic energizing means, the top is held by the groove surface of the groove of the guide rail so that the guide rail and the slider are in a clamp condition.

In this case, the groove may be formed as an inverted-T-shaped groove or as a dovetail slot.

Furthermore, the fluid pressure may be applied to either a rod side or a head side of the piston.

Since the top member held by the slider is engaged with the groove of the guide rail and prevented from slipping out of the groove, even when the rolling members fall off of the rolling member rolling grooves, the slider is never separated from or falls out of the guide rail. In addition, since the lateral side surfaces of the guide rail and the inner side surfaces of the slider are not slanted, the machining of the rolling member rolling grooves to be formed in these surfaces is easy.

Furthermore, since the fall-off preventing device and the clamp device are integrally formed, the structure is simple, and both functions of clamping and fall-off prevention of the slider and the guide rail can be achieved by a single device.

DESCRIPTION OF THE PREFERRED EMBODIMENTS

Figure 1:
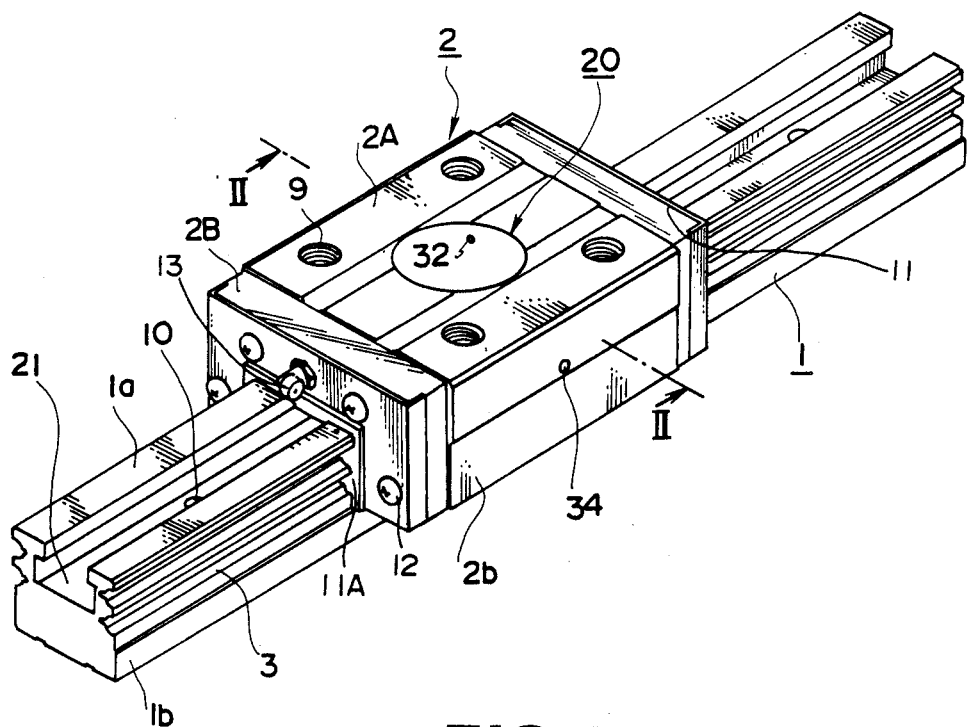
FIG. 1 is a perspective view of a first embodiment of the present invention.
Figure 2:
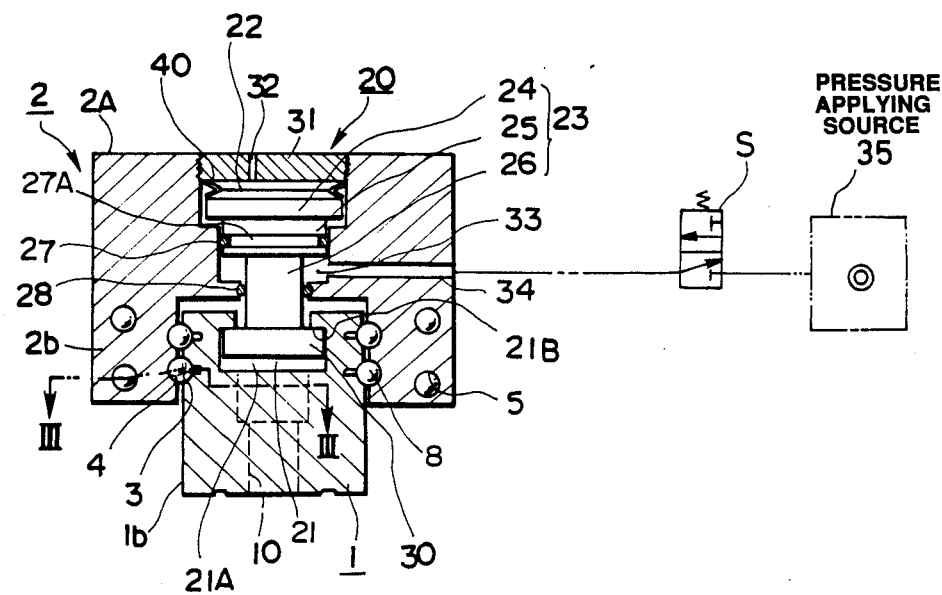
FIG. 2 is a cross sectional view taken along the line II—II in FIG. 1.
Figure 3:
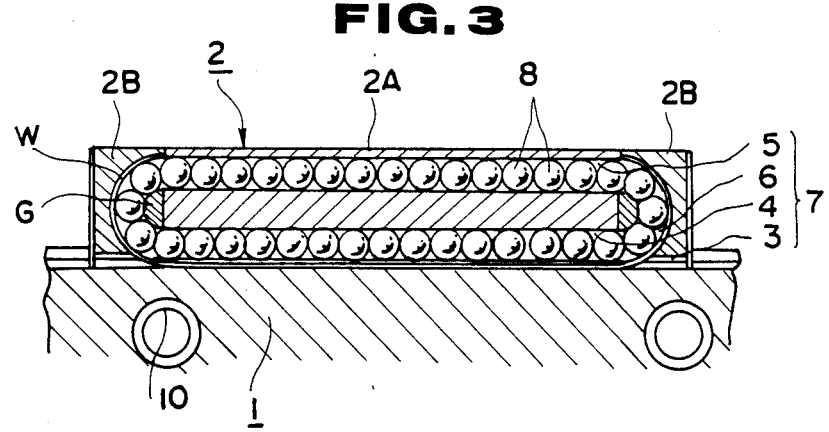
FIG. 3 is a cross sectional view taken along the line III—III in FIG. 2.

FIGS. 1 to 3 show a first embodiment of the present invention.

A guide rail 1 has a square cross section, and has axially extending ball rolling grooves 3 formed symmetrically in both lateral side surfaces 1b.

A slider 2 having an inverted U-shaped cross section is straddlingly mounted on the guide rail 1 and is movable in the axial direction. The slider 2 includes a slider main body 2A made of steel which has ball rolling grooves 4 formed in inner surfaces of both side walls 2b so that the ball rolling grooves 4 are respectively opposing the ball rolling grooves 3 of the guide rail 1. The slider main body 2A also has vertically aligned, parallel ball return paths 4 formed in each of thick wall portions of the side walls 2b. End caps 2B are secured to opposite ends of the slider main body 2A. Each end cap 2B is formed with curved paths 6 curved in a semicircular arc shape for respectively communicating corresponding ball return paths 5 with the ball rolling grooves 3 and 4. The end caps 2B are molded parts of plastic.

A ball circulating route 7 is formed by the opposing ball rolling grooves 3 and 4, the ball return path 5 and the curved path 6.

A multiplicity of balls 8 are rollably inserted in each ball circulating route 7 as rolling members.

The slider 2 has tapped holes 9 for fixing screws to secure a table to be moved to the slider 2. The guide rail 1 has through holes 10 for fixing screws to secure the guide rail 1 to a base. Reference numeral 11 designates a seal plate having a wiper 11A for wiping off dust on the upper surface 1a and side surfaces 1b of the guide rail 1. The seal plate 11 is attached to each of the end faces of the end caps 2B. Reference numeral 13 designates a grease nipple for feeding oil to the ball rolling grooves 4 of the slider 2.

With reference to FIG. 3, the letter G designates a guide member having a semicircular arc cross section which is fitted and fixed to an end face of the end cap 2B to form an inner peripheral surface of the curved path 6. The letter W designates a wire-like retainer for holding the balls 8 when the slider 2 is removed from the guide rail 1.

The linear guide apparatus includes a fall-off prevention and clamp device 20 serving for both preventing the slider 2 and the guide rail 1 from falling off from each other and for clamping the slider 2 to the guide rail 1.

Hereinafter, the fall-off prevention and clamp device 20 will be described in detail.

The guide rail 1 is formed with a recess 21A in an upper surface 1a which extends over the whole length of the guide rail 1 and which has a T-shaped groove 21 formed therein.

On the other hand, the slider main body 2A is formed with an inner bore 22 serving as a fluid pressure cylinder at a center portion and in an upwardly extending inner surface opposite the T-shaped groove. The cylinder bore 22 penetrates the slider main body 2A vertically and has upper, middle, and lower stages in this order from the upper portion. These stages have sequentially reduced inner diameters. A piston 23 is accommodated in the cylinder bore 22. The piston 23 has an enlarged head portion 24, a piston truck portion 25, and a piston rod 26.

The piston head portion 24 is accommodated in the upper stage of the cylinder bore 22, and the piston trunk portion 25 is fitted in the middle stage through an oil seal 27 which is fixed into a seal groove 27A. The piston rod 26 is inserted into the lower stage penetrating downwardly through an oil seal 28 to protrude towards the inverted T-shaped groove 21 of the guide rail 1. A top 30 of a disk shape having a larger diameter than the piston rod 26 is rigidly secured to an extreme end of the piston rod 26 by securing means, such as a bolt or the like.

The top 30 is normally loosely engaged with the inverted T-shaped groove 21, and functions as a fall-off prevention and clamp member.

The top 30 and the piston 23 which engages the cylinder bore 22 are integrally formed.

After the piston 23 is mounted in the cylinder bore 22, an opening (which opens at the upper surface of the slider main body 2A) at the upper stage of the cylinder bore 22 is covered by a screw cover 31. The screw cover 31 has an air vent hole 32.

Two sheets of belleville springs 40 overlapping each other and serving as elastic energizing means are mounted between the screw cover 31 and the piston head 24. This has a function to energize or bias the piston 23 in a non-clamp direction, and to separate the top 30 from a groove surface of the inverted T-shaped groove 21 of the guide rail 1.

Within the cylinder bore 22, a space defined by the piston trunk portion 25 and the piston rod 26 forms a pressure chamber 33. This pressure chamber 33 communicates with the outside by a communicating path 34 laterally penetrating the slider main body 2A. An opening of the communicating path 34 is connected to a piping leading to a pressure supply source 35 of fluid pressure (oil pressure or air pressure). A valve S for switching the pressure circuits is inserted in a midway position of the piping.

In clamping the slider 2 to the guide rail 1, a fluid pressure is applied to the pressure chamber 33 to produce a force to overcome the elastic energizing force of the belleville springs 40 and, thus, the piston 23 is energized to the clamp direction to thereby make the top 30 engage a neck portion 21B of the T-shaped groove 21 of the guide rail 1.

In assembling the slider 2, the slider 2 is inserted from one end of the guide rail 1. As a result, the top 30 is loosely fitted into the recess 21A of the T-shaped groove 21 of the guide rail 1.

At the same time, a multiplicity of balls 8 held in the ball rolling groove 4 through the retainer W in the slider 2 are fitted in the ball rolling groove 3 of the guide rail 1. In a condition in which the slider 2 is assembled normally to the guide rail 1, the slider 2 is prevented from falling off the guide rail 1 through the balls 8.

In operation, the guide rail 1 of the linear guide apparatus structures as described above is secured to a base of a ceiling with bolts. A predetermined object to be moved is mounted on the slider 2 with bolts. With a movement of the object to be moved, the slider 2 is moved along the guide rail 1 in its axial direction. With this movement, the balls 8 inserted in the ball rolling grooves 3 and 4 move while rolling in a direction opposite to the movement direction of the slider 2. The balls 8 make a U-turn along the curved path 6 at a rear end portion of the slider 2.

Subsequently, the balls 8 pass through the ball return path 5 of the slider main body 2A, again make a U-turn by the curved path 6 of the end cap 2B at the opposite side and return to the ball rolling grooves 3 and 4 to thereby repeat circulation while rolling and moving.

In this manner, the slider 2 moves smoothly, and the object is moved.

In such a normal use condition, the top 30 of the fall-off prevention and clamp device 20 is only loosely fitted in the T-shaped groove 21 of the guide rail 1, and both the top 30 and the T-shaped groove 21 are in a non-contact condition. Specifically, the piston 23 is at a position of a lower limit (at an upper limit when the slider 2 is hung) by being energized or biased by the belleville springs 40, and the top 30 is spaced from the neck portion 21B of the T-shaped groove 21. As a result, they do not disturb the travelling of the slider 2.

The fall-off prevention operation of the fall-off prevention and clamp device 20 is as follows.

If the end cap 2B of the slider 2 is broken due to a collision with a driving device or the like while the slider 2 is in a ceiling travelling condition, the balls 8 will fall off of the ball rolling grooves 3 and 4 when the slider 2 moves. Then, the slider 2 is released from holding means which holds the slider 2 to the guide rail 1 through the balls 8, and tends to fall.

However, when the slider 2 is lowered slightly, the top 30, which has been loosely fitted in the T-shaped groove 21, is held by the neck portion 21B of the T-shaped groove 21. As a result, the slider 2 is supported by the guide rail 1 through the top 30 with only a small downward falling movement of the slider 2.

Furthermore, the clamping operation of the fall-off prevention and clamp device 20 is as follows.

In clamping the slider 2 to the guide rail 1, the valve S is changed over to apply the air pressure (or oil pressure) to the pressure chamber 33 from the pressure supply source 35 via the communication path 34. Accordingly, the piston 23 is energized in the clamp direction and is pushed upwardly against the elastic energizing force of the belleville springs 40, as shown in FIG. 2. As a result, the top 30 engages the neck portion 21B of the T-shaped groove 21 of the guide rail 1, and the slider 2 is securely clamped to the guide rail 1.

When the valve S is changed over to release the pressure in the pressure chamber 33, the piston 23 is pressed elastically by the belleville springs 40 to move downwardly as shown in FIG. 2. As a result, the top 30 is separated from the neck portion 21B of the T-shaped groove 21 of the guide rail 1, and the clamping of the slider 2 to the guide rail 1 is released.

Figure 4:
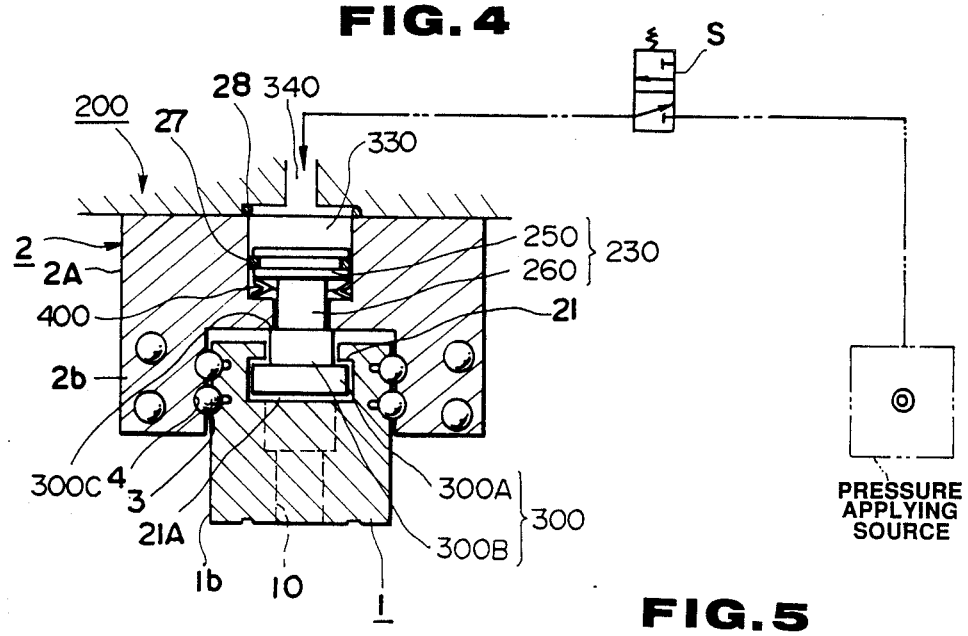
FIG. 4 is a cross sectional view corresponding to FIG. 2 of a second embodiment of the present invention.

FIG. 4 shows a second embodiment of the fall-off prevention and clamp device 200.

This embodiment differs from the first embodiment in that belleville springs 400 are mounted to a rod side of a piston 230, and a pressure chamber 330 is formed at a piston head side. Furthermore, a top 300 is formed into two stages including a head portion 300A which is loosely fitted in a recess 21A of a T-shaped groove 21 and has a large diameter. The top 300 also includes a small diameter portion 300B. Normally, the piston 230 is pushed upwardly by an elastic energizing force of the belleville springs 400 so that a shoulder portion 300/c of the small diameter portion 300B of the top 300 is held at the inner surface of the slider 2, and the top 300 is not in contact with the neck of the T-shaped groove 21.

Accordingly, the slider 2 is freely movable along the guide rail 1 through the balls 8.

In the case when the balls 8 fall off, a jaw of the head portion 21B of the T-shaped groove 21 and the fall-off of the slider 2 is prevented. This is the same as in the first embodiment.

In clamping, when a fluid pressure is applied to the pressure chamber 330, the piston 230 is pressed downwardly as shown in FIG. 4, and the top 300 is pressed against a bottom surface of the T-shaped groove 21. As a result, it is possible to clamp the slider 2 to the guide rail 1.

The second embodiment provides an advantage in which it is easy to operate when the slider 2 is fixed to an upper structure.

While the balls are used as rolling members in each embodiment, the invention is not limited to this, and the present invention is applicable to a roller linear guide apparatus in which rollers are employed.

Figure 5:
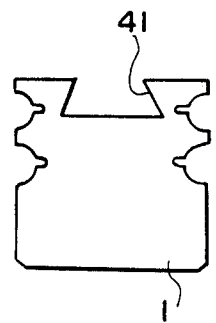
FIG. 5 is a front view showing an example of a groove in the guide rail.

Furthermore, in place of the inverted T-shaped groove, a dovetail slot, as shown in FIG. 5 may be used. In this case, the machining of the guide rail is easy and the sweeping if the inside of the slot becomes easier. In this case, it is preferable to form a slant surface on the top from the head portion to the jaw in correspondence to the slant surface of the dovetail slot.

As described in the foregoing, in a linear guide apparatus with a fall-off prevention and clamp device in the present invention, an inverted T-shaped groove, a dovetail slot, or the like is formed in an upper surface of the guide rail over the whole length thereof, and a top which engages the groove so as not to slip out of the groove and a piston provided in the slider are integrally formed. An energizing force of an elastic member and a fluid pressure which are respectively acting on the piston in opposite directions are changed over to separate the top from the guide rail or to bring the top in contact with the guide rail. Accordingly, in the present invention, there is not need to form a slant surface on each of the lateral side surfaces of the guide rail and on each of the inner surfaces of both side walls of the slider. As a result, an advantage is provided in that the measurement of the rolling member rolling grooves to be formed in the lateral side surface of the guide rail and in the inner surfaces of the slider becomes easier, and thus the machining is easy. Furthermore, there is no danger of fall-off of the slider from the guide rail, or the guide rail from the slider, and the clamping of both the guide rail and the slider can be performed by remote manipulation if necessary. In addition, the structure of the linear guide apparatus with a clamp device in the present invention is simple.

What is claimed is:

1. In a linear guide apparatus with a clamp device comprising an axially extended guide rail having a square cross section and rolling member rolling grooves respectively formed in both lateral side surfaces, a slider movably and straddlingly mounted on said guide rail and having rolling member rolling grooves respectively formed in the inner surfaces of both side walls to respectively oppose the rolling member rolling grooves of said guide rail, and a plurality of rolling members rollably inserted in opposing ones of the rolling member rolling grooves of said guide rail and said slider, the improvement comprising:

a groove formed in an upper surface of said guide rail extending over the whole length thereof;

a cylinder bore formed in said slider extending upwardly from an inner surface to oppose said groove in said guide rail;

a top and a piston integrally formed together, said top engaging said groove of said guide rail and prevented from slipping out of said groove, said piston engaging said cylinder bore;

elastic energizing means for energizing said piston in a non-clamp direction to separate said top from a groove surface of said groove of said guide rail and to bring said guide rail and said slider into a non-clamp condition; and fluid pressure applying means for applying a fluid pressure to said piston to energize said piston in a clamp direction against said elastic energizing means to make said top held by the groove surface of said groove of said slider in a clamp condition.

2. The apparatus according to claim 1, wherein said groove of said guide rail is an inverted T-shaped groove.

3. The apparatus according to claim 1, wherein said groove of said guide rail is a dovetail slot.

4. The apparatus according to claim 1, wherein said piston has opposed head and rod sides and said fluid pressure is applied to said rod side of said piston.

5. The apparatus according to claim 1 wherein said piston has opposed head and rod sides and said fluid pressure is applied to said head side of said piston.

* * * * *